Dec. 6, 1949     C. B. HANNAY     2,490,353

HOSE REEL

Filed Feb. 3, 1948

Inventor
CLIFFORD B. HANNAY

H. G. Lombard
ATTORNEY

Patented Dec. 6, 1949

2,490,353

UNITED STATES PATENT OFFICE 2,490,353

HOSE REEL

Clifford B. Hannay, Westerlo, N. Y., assignor to Clifford B. Hannay & Son, Inc., Westerlo, N. Y., a corporation of New York Application February 3, 1948, Serial No. 5,947

1 Claim. (Cl. 299—78)

This invention relates, in general, to hose reels and more particularly to hose reels of the kind which provide a connection from a source of fluid to a hose that remains attached to the reel and may be wound and unwound from the reel, as desired, without disconnection from the source of fluid.

A primary object of the invention is to provide such a hose reel in which the reel is rotatable while connected to the source of fluid and which comprises for this purpose an improved combined fluid tight packing joint and hose reel support having a compact and highly simplified construction that is adapted for a wide range and variety of applications to various types and designs of hose reels.

A further object of the invention is to provide a hose reel and packing joint of this character in which the fluid tight packing joint comprises a rotatable shaft that is supported with clearance from the associated housing in a floating mounting which compensates for limited distortion in the frame of the hose reel in the use thereof and otherwise prevents objectionable metal to metal contact of the rotatable shaft with the adjacent bearing structure in the event of such distortion.

Another object of the invention is to provide a hose reel and packing joint, as aforesaid, which comprises a rotatable tubular shaft that serves both as a support for the reel and as a conduit to an elbow defining the outlet in the reel to which the hose remains attached in connection with the source of fluid during winding or unwinding from the reel.

A further object of the invention is to provide a hose reel comprising a packing joint such as described together with an improved combined shaft support and outlet elbow arrangement provided by a simple T-coupling having an intermediate integral web or baffle defining a fluid passage from the tubular shaft to the outlet elbow at one end of said T-coupling, and a connection at its other end for mounting another shaft which supports the hose reel on the side opposite the packing joint.

Further objects and advantages, and other new and useful features in the construction, arrangement and general combination of parts of the invention will be readily apparent as the following description proceeds with reference to the accompanying drawings, for purposes of illustration but not of limitation, in which like reference characters designate like parts throughout, and in which.

Referring now, more particularly, to the drawings, the improved packing joint construction of the invention is disclosed by way of illustration only, as employed in what is commonly known as bucket box type of hose reel apparatus. It is to be understood, however, that the invention is not limited in any manner or form to the specific type of hose reel shown but rather, is equally adaptable to a wide range and variety of other applications and uses in any similar or related type of hose reel fluid delivery apparatus. It is to be understood, further, that the term "fluid" as used in this description is intended to refer to all types of liquids and gases, such as oil, water, and air.

Figure 2:
Fig. 2 is a front elevational view of the hose reel apparatus shown in Fig. 1.

In the present example, the mounting for the hose reel is provided by a base defined by spaced brackets 1 each of which comprises vertical posts 2 supporting a horizontal bar or beam 3 and provided with suitable strengthening means such as struts 4 and horizontal braces 5. The brackets 1 are secured in spaced relation as by lower cross plates 6 and upper cross rods 7 bolted, riveted, welded or otherwise secured thereto in any suitable manner. As shown in Fig. 2, the cross rod 7 at the forward side of the base preferably is rounded in the manner of a roller to cooperate with a lower horizontal roller 8 attached to the cross plate 6 and vertical rollers 9 secured between the cross rod 7 and said horizontal roller 8. The rod 7, horizontal roller 8 and vertical rollers 9 define a rectangular guide opening through which the hose passes on being wound or unwound from the reel and serve as antifriction rollers minimizing resistance and drag on the hose in any such operation.

The frame of the hose reel, designated generally 10, comprises a pair of spaced discs or flanges 12 on either side of a central drum 15 preferably in the form of a sheet metal cylinder suitably secured between said discs 12. The drum is provided with a cutout opening 16, Figs. 2 and 4, through which there extends an L-shaped elbow 18, or the like, which is connected at its inner end in communication with the fluid passage through the packing joint, as presently to be described. The hose (not shown) is connected to the outlet end 19 of said elbow 18 outwardly of the drum 15 and from this point is coiled around said drum between the discs 12 in the usual manner and arranged to pass through the guide opening defined by the rod 7 and antifriction rollers 8, 9, on being wound or unwound from the reel.

Figure 1:
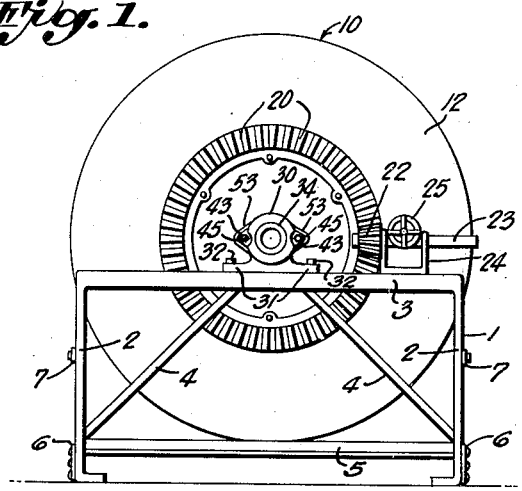
Fig. 1 is a side elevational view of a typical hose reel apparatus provided with a packing joint in accordance with the invention.

As shown in Figs. 1 and 2, a ring gear 20 is riveted or otherwise concentrically attached to the outer side of one of the reel side flanges 12 and in mesh therewith is a pinion 22 on a pinion shaft 23 which is journalled in a bracket 24 on the adjacent horizontal base bar 3. The outer end of the pinion shaft 23 extends free and is adapted to be turned by a suitable crank to rotate the pinion 22 and actuate the ring gear 20 and thereby rotate the reel 10 in rewinding the hose thereon. Preferably a brake is employed to lock the pinion shaft 23 against movement when the hose is fully wound on the reel so as to prevent unintended unwinding of the hose. To this end, a brake wheel 25 is employed having a spindle provided with a screw mounting on the bracket 24 so that the leading end of said spindle is in position to bear upon and retain the pinion shaft 23 against movement when the wheel 25 is turned to locking position or conversely, to clear the pinion shaft 23 and permit free rotation thereof when the wheel 25 is turned to unlocked position.

Figure 4:
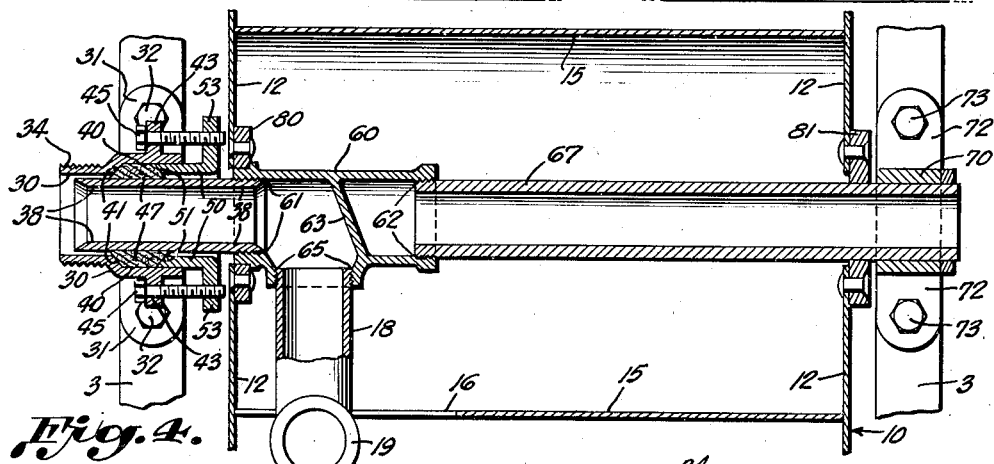
Fig. 4 is a horizontal sectional view of Fig. 2 along line 4—4 looking in the direction of the arrows, showing in detail the construction of the combined packing joint and shaft support for the hose reel; and, Fig. 5 is a close-up view of the housing for the packing joint at the inlet end thereof which is connected to the source of fluid.
Figure 3:
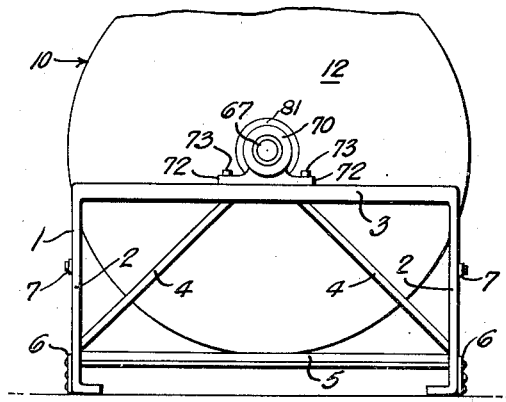
Fig. 3 is a side elevational view of the hose reel apparatus as seen from the side opposite that shown in Fig. 1.

As illustrated in Fig. 4, the improved packing joint comprises a relatively compact construction at one side of the reel to serve both as a support for the adjacent side of the reel and as a fluid tight passage for passing the fluid through the drum 15 to the outlet elbow 18. The packing joint comprises a generally annular housing 30 having base flanges 31 for mounting the same to the horizontal base bar or beam 3, as by bolts 32, welding, rivets or other suitable securing means. The outer end of said housing 30 is threaded as at 34 or otherwise suitably formed for use of a coupling to connect the source of fluid thereto.

Figure 5:
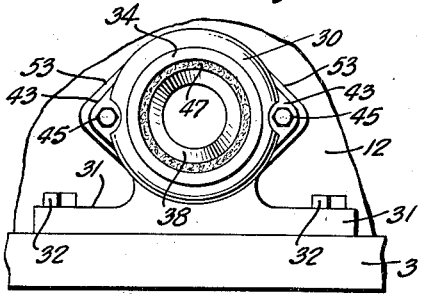

A tubular shaft, sleeve or hub 38, provided preferably with bevelled ends to facilitate passage of the fluid, is supported within said housing 30 with the outer surface thereof having a substantial clearance from the adjacent walls of the housing 30 and the associated packing gland 50. To this end, the housing is formed adjacent the threaded end 34 in the manner of an outward annular enlargement defining a cylindrical chamber or recess 40 and an adjacent inclined inner shoulder 41 which is bevelled inwardly at an acute angle, as shown. On the outer surface of the housing there are provided integral ears 43 having apertures for receiving cap screws 45. As shown in Figs. 1 and 5, the portions of the housing 30 adjacent the said cap screws 45 are suitably indented to accommodate the heads of said cap screws and permit the application of a tool thereto to turn the same. In the cylindrical chamber or recess 40 within the housing, a packing 47 is provided preferably in the form of woven, round packing rope impregnated with oil resistant material and arranged in closely packed convolutions around the tubular shaft 38.

On the opposite side of the packing 47 there is provided the packing gland 50 in the form of a tubular bushing which is received in telescoped relation in the cylindrical recess 40 defined by the enlarged annular portion of the housing 30 with a substantial clearance from the tubular shaft or hub 38. The inner end of said packing gland 50 is provided with an inclined shoulder 51 bevelled inwardly at an acute angle in oppositely inclined relation to the shoulder 41 within the housing 30. The outer end of said packing gland is in the form of an outward flange defining opposite ears 53 which are provided with tapped openings for threadedly engaging the cap screws 45 carried by the similar ears 43 on the housing 30.

Accordingly, it will be understood that upon tightening of the cap screws 45 the packing gland 50 is drawn axially within the housing 30 so that the oppositely inclined shoulders 41, 51, in the housing and on the packing gland, respectively, compress the packing 47 therebetween and against the tubular shaft 38. By virtue of the bevelled formation of the shoulders 41, 51, in inclined relation, said shoulders compress the packing in a manner to cause the packing to bulge outwardly against the tubular shaft or hub 38 and thereby support said shaft with a constant, uniform clearance from the adjacent walls of the housing 30 and the packing gland 50. Thus, only the packing 47 is in contact with the tubular shaft or hub 38 to support said shaft in a fluid tight joint while otherwise permitting rotation of the shaft without metal to metal contact with the adjacent walls of the housing 30 and packing gland 50. This clearance between the hub or shaft 38 and the inner walls of both the housing 30 and packing gland 50 ensures operation of the packing joint in what may be termed a floating bearing support of said shaft or hub 38 on the packing 47. Such clearance is ample to compensate and absorb a limited amount of distortion in the frame of the hose reel without causing metal to metal contact of the shaft or hub 38 with the adjacent walls of the housing 30 and gland 50, as aforesaid. The described clearance mounting of the tubular shaft or hub 38 in the packing joint is maintained constant and uniform, and the complete packing joint retained fluid tight by periodic tightening of the cap screws 45 to compensate for wear on the packing 47.

The inner bevelled end of the tubular shaft or hub 38 extends within the drum 15 and is fixedly joined to a T-coupling 60, as by a threaded connection, as shown. The T-coupling involves a highly advantageous and relatively inexpensive construction in that it comprises merely a simple tubular member open at both ends 61, 62, respectively, and is provided with an integral imperforate baffle 63 adjacent a lateral opening 65 in which the outlet elbow 18 is connected. The inner end 61 of the T-coupling 60, accordingly, is readily adapted for a threaded connection to the shaft or hub 38 while the opposite end 62 thereof is connected to a supporting shaft or axle 67, which may be in the form of either a pipe or a rod, and has its outer end mounted on a bearing 70 to support the hose reel on the side opposite the packing joint. The bearing 70 may be of any suitable type in the form of a yoke, or the like, embracing the end of the shaft 67 and provided with base flanges 72 which are secured to the associated horizontal base bar or beam 3, as by bolts 73, welding, rivets or other suitable fastening means.

In order to strengthen and rigidify the mounting of the drum 15 and side flanges or discs 12 on the overall shaft construction defined by the tubular shaft 38, T-coupling 60 and shaft 67, a reinforcing ring or collar 80 is provided on the inner end 61 of the T-coupling 60 and the same riveted or otherwise secured to the marginal portions of the adjacent reel disc 12. Likewise, a similar reinforcing ring or collar 81 is supported on the shaft 67 and riveted or otherwise secured to the marginal portions of the adjacent disc 12 at the opposite side of the hose reel.

From the foregoing, it will be understood that a hose reel construction embodying a packing joint in accordance with the invention is readily fabricated in a minimum of time and assembling operations to provide the tubular shaft 38 in the described floating mounting in the housing 30 with its outer bevelled end adjacent the outer threaded connection 34 on said housing. The shaft 38 is thus arranged for rotation in the housing yet is rigidly supported by the housing on the horizontal bar 3 of the hose reel base. When connected to the outer end 61 of T-coupling 60 within the drum 15, said tubular shaft 38 serves as a rotatable support for the adjacent side of the hose reel in cooperation with the shaft 67 which is connected to the inner end 62 of the T-coupling and rotatably mounted in the bearing 70 to support the hose reel on the opposite side thereof.

The shaft 38, in addition to this function, serves as a passage for the fluid which enters the inlet connection 34 from the source of the fluid. The fluid thus passes through the tubular shaft 38 to the T-coupling 60 where the integral imperforate baffle or web 63 therein directs the fluid through the elbow 18 to the hose (not shown) connected to the outlet 19 on said elbow. The hose as thus connected to the outlet 19 is coiled around the drum 15 between the side flanges or discs 12 in the customary manner. Accordingly, for any dispensing operation, the hose is adapted to be pulled and thereby unwound from the drum 15 for any desired length during which the inner end of the hose remains connected to the elbow 18 and rotates along therewith and the hose reel drum and frame as permitted by the rotatable mounting of the tubular shaft 38. When the desired length of hose has been drawn from the drum, the conventional shut-off nozzle on the leading end of the hose is opened to commence the dispensing operation without further preparation inasmuch as the hose is already connected to the source of fluid through the elbow 18, T-coupling 60 and tubular shaft 38, as aforesaid.

Rewinding of the hose on the drum is easily and quickly effected by a suitable crank applied to the pinion shaft 23 to rotate the reel by means of the pinion 22 and ring gear 20 in the direction for rewinding the hose on the reel, whereupon the brake is applied by turning the brake wheel 25 to locking position for retaining the pinion shaft 23 against movement which would permit unintended rotation of the hose reel in the direction for unwinding the hose from the reel.

The various parts of the packing joint preferably are fabricated from either malleable iron or brass castings, and the dimensions of which are selected according to load and service requirements and the predetermined size and design of any particular hose reel construction. Accordingly, while the invention has been described in detail with a specific example, such example is intended as an illustration only, inasmuch as it will be apparent that other modifications in the construction, arrangement and general combination of parts may be devised without departing from the spirit and scope of the invention. The present embodiment is therefore to be considered in all respects as illustrative and not restrictive, the scope of the invention being indicated by the appended claim rather than by the foregoing description, with all changes falling within the scope, meaning, and range of equivalency of the claim intended to be embraced therein.

What is claimed and desired to be secured by United States Letters Patent is:

In a hose reel apparatus comprising a base and a hose reel including a central shaft having a projecting tubular end at one side of said hose reel, a leakproof swivel mounting for said projecting tubular end of the shaft on said base comprising a housing fixedly secured to said base and receiving said projecting end of the tubular shaft in a manner whereby said shaft end is capable of readily supporting the hose reel under relatively heavy loads, said housing having an annular shoulder therein bevelled inwardly toward said tubular shaft, lateral ears on said housing having holes therein and screws extending through said holes, packing on the tubular shaft within the housing, a packing gland telescoped within said housing having an annular shoulder on its inner end bevelled inwardly toward said tubular shaft, lateral ears on said packing gland having holes receiving said screws, said screws serving to draw the packing gland axially within said housing to cause said inwardly bevelled annular shoulders on the housing and packing gland to compress the packing in a manner to support said tubular shaft for rotation with clearance from the adjacent walls of said housing and packing gland.

CLIFFORD B. HANNAY.

REFERENCES CITED

The following references are of record in the file of this patent:

UNITED STATES PATENTS

| Number | Name | Date |
|---|---|---|
| 177,367 | Bartlett | May 16, 1876 |
| 416,863 | Schenck | Dec. 10, 1889 |
| 689,643 | Gibbs | Dec. 24, 1901 |
| 990,453 | Newton | Apr. 25, 1911 |
| 1,434,952 | Johnson Jr. | Nov. 7, 1922 |
| 2,227,105 | Pritchard | Dec. 31, 1940 |

FOREIGN PATENTS

| Number | Country | Date |
|---|---|---|
| 2,124 of 1867 | Great Britain | July 20, 1867 |